(12) United States Patent
Chopra et al.

(10) Patent No.: US 12,656,811 B1
(45) Date of Patent: Jun. 16, 2026

(54) CLOCK SYNCHRONIZATION DURING GLOBAL NAVIGATION SATELLITE SYSTEM HOLDOVER

(71) Applicant: Amazon Technologies, Inc., Seattle, WA (US)

(72) Inventors: Aditya Chopra, Austin, TX (US); Mustafa Cenk Erturk, Austin, TX (US); Arunabha Ghosh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 18/758,286

(22) Filed: Jun. 28, 2024

(51) Int. Cl.
*G06F 1/12* (2006.01)
*G01S 19/25* (2010.01)

(52) U.S. Cl.
CPC .............. *G06F 1/12* (2013.01); *G01S 19/256* (2013.01)

(58) Field of Classification Search
CPC ...... G01S 19/215; G01S 5/0249; G01S 19/21; G01S 7/2813; H01Q 3/2611; H04B 1/10
See application file for complete search history.

(56) References Cited

U.S. PATENT DOCUMENTS

| | | | | |
|---|---|---|---|---|
| 6,493,650 | B1 * | 12/2002 | Rodgers ................... | G08G 3/00 |
| | | | | 340/815.69 |
| 6,779,752 | B1 * | 8/2004 | Ratkovic ................. | G01S 19/21 |
| | | | | 342/16 |
| 10,545,246 | B1 * | 1/2020 | Johnston ................. | G01S 19/21 |
| 11,762,103 | B2 * | 9/2023 | Martin ............... | H04B 1/70752 |
| | | | | 342/357.62 |
| 2025/0294355 | A1 * | 9/2025 | Tobias ................... | H04W 12/40 |
| 2025/0300719 | A1 * | 9/2025 | Mochizuki ............. | H04B 17/21 |

FOREIGN PATENT DOCUMENTS

| | | | | |
|---|---|---|---|---|
| CA | | 3076387 A1 * | 9/2018 | ........... H04B 7/2125 |

* cited by examiner

*Primary Examiner* — Zahid Choudhury

(74) *Attorney, Agent, or Firm* — Kilpatrick Townsend & Stockton LLP

(57) ABSTRACT

Technologies directed to estimating global navigation satellite system (GNSS) holdover time solutions are described. At a first time, at least four navigation messages are received. These navigation messages are used to determine an Earth-Centered, Earth-Fixed (ECEF) position. At a second time after the first time, less than four navigation messages are received. The ECEF position and an amount of time elapsed between the first and second times are used to determine a time solution corresponding to the second time. This time solution is used to synchronize a pulse per second (PPS) system to GNSS time.

20 Claims, 8 Drawing Sheets

600

SATELLITE 502

STRUCTURAL SYSTEM 514

CONTROL SYSTEM 520

FLIGHT CONTROL PROCESSOR 608

TRACKING, TELEMETRY, CONTROL SYSTEM 610

POWER MANAGEMENT AND DISTRIBUTION (PMAD) SYSTEM 612

POWER SYSTEM 526

PHOTOVOLTAIC PV ARRAY(S) 616

PV ARRAY ACTUATOR 618

BATTERY(S) 614

MANEUVERING SYSTEM 532

REACTION WHEEL(S) 620

THRUSTER(S) 622

MAGNETIC TORQUE ROD(S) 624

BUS(ES) 606

SENSOR(S) 602

ENGINEERING CAMERA 626

ACCELEROMETER 628

GYROSCOPE 630

GNSS 632

STAR TRACKER 634

COARSE SUN SENSOR 636

COMMUNICATION SYSTEM 538

INTERSATELLITE LINK FPGA 644

ISL TRANSCEIVER 646

COMMUNICATION FPGA 648

MODEM 638

DOWNLINK TRANSMITTER 650

UPLINK TRANSMITTER 652

ANTENNA(S) 640

CALIBRATION ANTENNA 642

PULSE PER SECOND SYSTEM 604

FIG. 6

CLOCK SYNCHRONIZATION DURING GLOBAL NAVIGATION SATELLITE SYSTEM HOLDOVER

BACKGROUND

A large and growing population of users is enjoying entertainment through the consumption of digital media items, such as music, movies, images, electronic books, and so on. The users employ various electronic devices to consume such media items.

Satellite-based broadband internet constellations are being developed to provide high-speed, low-latency broadband internet access to locations around the world using a network of low Earth orbit (LEO) satellites, ground stations, and user terminals (UTs) (also called customer terminals (CTs).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1 illustrates a satellite system with a space vehicle (SV) receiving navigation messages from global navigation satellite system (GNSS) satellite(s), according to one embodiment.

FIG. 6 is a functional block diagram of some systems associated with the satellite, according to at least one embodiment.

DETAILED DESCRIPTION

Figure 2:
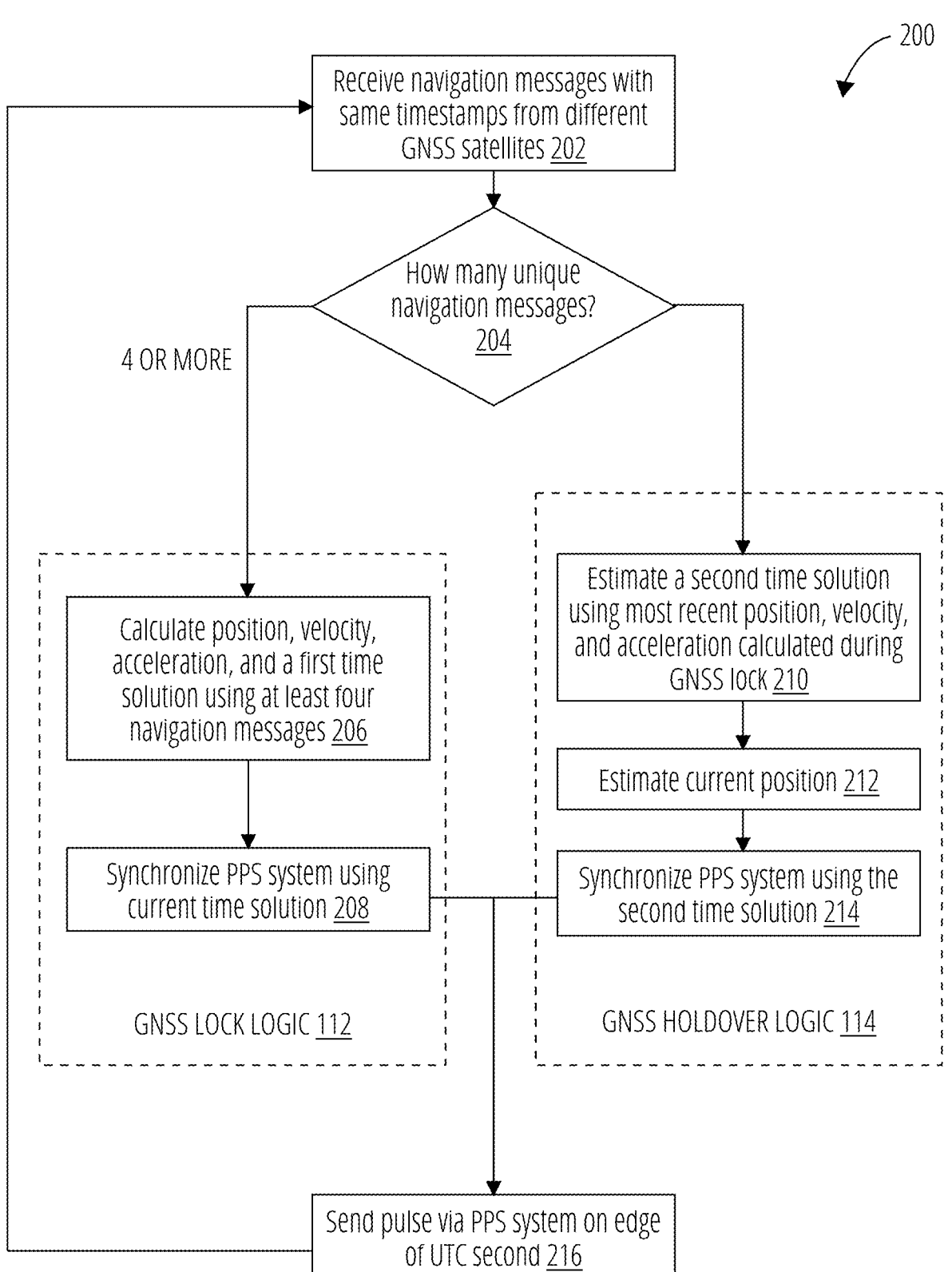
FIG. 2 is a flowchart illustrating a process of synchronizing a pulse per second (PPS) system to GNSS time, according to one embodiment.

Technologies directed to estimating global navigation satellite system (GNSS) holdover time solutions are described. In general, when a space vehicle (SV) receives signals containing position and time information from at least four GNSS satellites (referred to as GNSS lock), the SV can synchronize a pulse per second (PPS) system to GNSS time. GNSS time may refer to any time kept by a GNSS system, such as global positioning system (GPS) time, GLONASS time, Galileo system time (GST), or BeiDou time (BDT). This position and time information may be sent in navigation messages that are periodically broadcasted by GNSS satellites. This PPS system may be synchronized to GNSS time by comparing an on-board clock of the SV to a solved time solution derived from the navigation messages.

When the SV receives navigation messages from less than four GNSS satellites, the SV may not be able to determine this time solution. This may be referred to GNSS holdover (also known as GNSS lock loss). During GNSS holdover, the SV is not able to conventionally solve for the time solution because the SV did not receive navigation messages from at least four GNSS satellites. Without a solved time solution to compare against the on-board clock, the PPS system can fall out of synchronization with the GNSS time within mere seconds. Among other things, GNSS holdover may be caused by fast changing skyviews, processing time contention from other processes, or beta angle flips where the SV is upside down and one GNSS antenna is pointing at Earth.

Many different techniques may be implemented to reduce the risk of GNSS holdover. A GNSS satellite acquisition process may be optimized to use less processing time. Almanac-assisted acquisition may be used to assist the SV in acquiring satellite signals and tracking the respective GNSS satellite. A number of tracked GNSS satellites may be increased. While these techniques may lower the risk of GNSS holdover, GNSS holdover can still be unavoidable. Thus, there stands a need for a solution capable of synchronizing the PPS system to the GNSS time during GNSS holdover.

Aspects and embodiments of the present disclosure described herein address the problems and deficiencies described above and others by providing a technique of comparing the on-board clock of the SV to a time solution solved using last known position information and at least one current navigation message from a GNSS satellite. A time solution may be estimated by supplementing navigation messages from less than four GNSS satellites with a last known position, velocity, and acceleration of the SV. Aspects and embodiments of the present disclosure may provide an estimate time solution to synchronize the PPS system to the GNSS time while the SV is in GNSS holdover.

Figure 1:
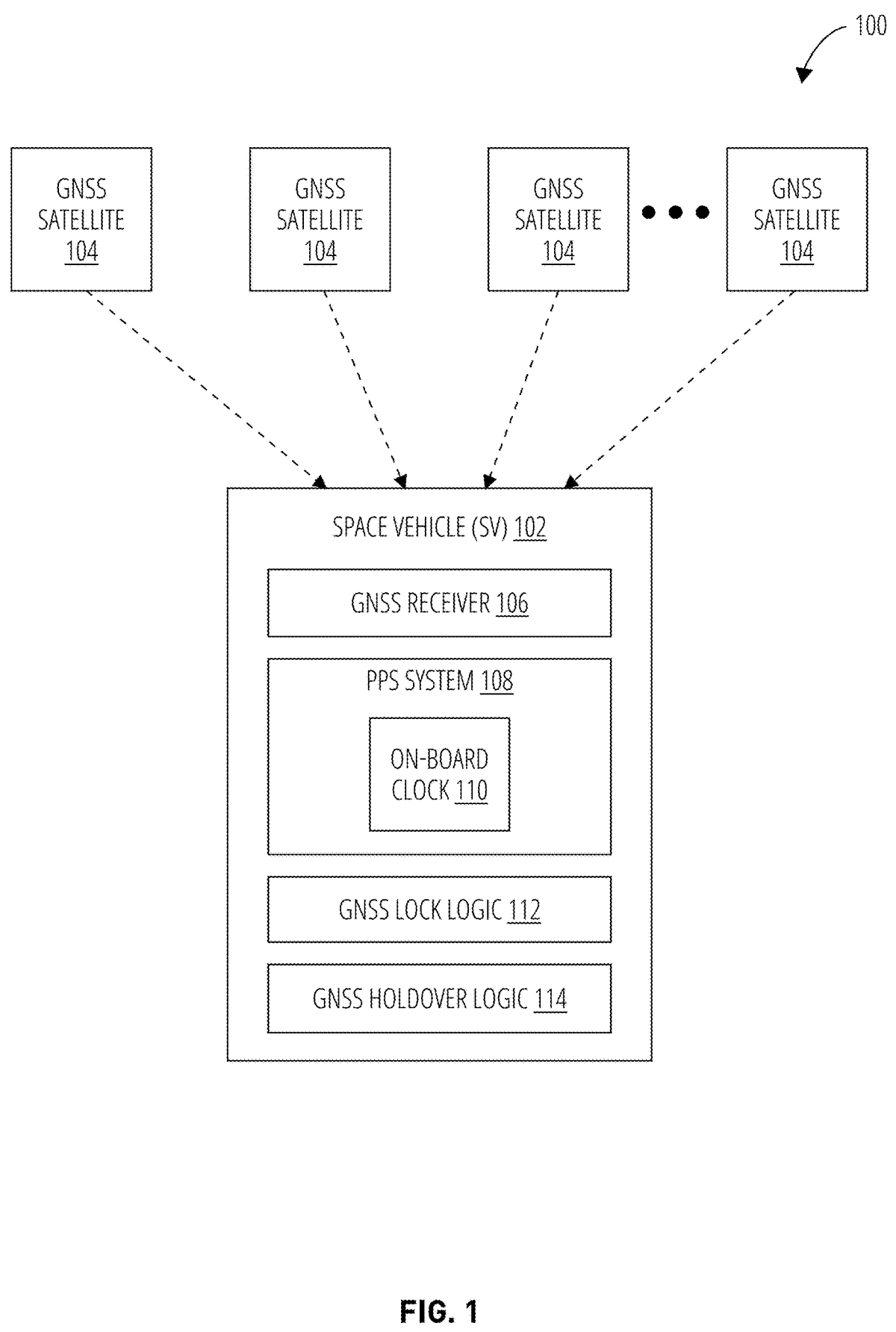

FIG. 1 illustrates a satellite system 100 with a space vehicle (SV) 102 receiving navigation messages from global navigation satellite system (GNSS) satellite(s) 104, according to one embodiment. The SV 102 may include a GNSS receiver 106 to receive the navigation messages from the GNSS SV(s) 104. The GNSS receiver 106 onboard the SV 102 may receive and track navigation messages from GNSS satellites within its skyview. The GNSS receiver 106 may periodically scanning the visible sky for signals emitted by GNSS satellites. These signals carry time and position information about the respective GNSS satellite(s) 104, encoded in navigation messages. This navigation message may typically include ephemeris data of the respective GNSS satellite 104, which describes the satellite's orbital parameters such as its position, velocity, and clock corrections. Additionally, the navigation message provides information about the satellite's health status, integrity parameters, satellite identifier, and the current time according to the GNSS system's reference clock. Collectively, the information provided by each navigation message may allow an SV with a GNSS receiver (e.g., the SV 102) to accurately compute its own position in space and synchronize a pulse per second (PPS) signal to a GNSS time. In at least one embodiment, a navigation message received from a GNSS satellite 104 includes position, a velocity parameter, and time information about the respective GNSS satellite 104. An acceleration parameter of the respective GNSS satellite 104 may be inferred indirectly by the SV 102 by analyzing changes in the position and velocity of the respective GNSS satellite 104 over time. By continuously tracking the movement and velocity of the respective GNSS satellite 104, the SV 102 can deduce changes in acceleration based on variations in velocity.

Once the GNSS receiver 106 detects signals from multiple GNSS satellites 104, the GNSS receiver 106 may proceed to track each of these GNSS satellites 104 by continuously monitoring the phase, frequency, and amplitude of the respective signals. The time and position information about each of the tracked GNSS satellite(s) 104 can provide the SV 102 with a capability of determining or estimating the SV's 102 own position, velocity parameter, acceleration parameter, and time solution. The time solution may allow the SV 102 to understand the GNSS time relative to an on-board clock 110, and subsequently allow a pulse per second (PPS) system 108 to generate a pulse at the edge of a second of the GNSS time. As such, the time solution be used to synchronize a pulse per second (PPS) system 108 of the SV 102 to the GNSS time. In some embodiments, the PPS system 108 may be synchronized to the GNSS time by disciplining an on-board clock 110 using the time solution. This on-board clock 110 may be disciplined using the time solution by offsetting a counter or timer that indicates an edge (e.g., start) of a new second based on the timing solution. This on-board clock may also be disciplined with the time solution using other conventional methods.

The on-board clock 110 may operate based on a voltage-controlled oscillator (VCO). At times, a frequency of this VCO may vary. This frequency of this VCO may be adjusted upward or downward (e.g., disciplined) by, for example, adjusting a control voltage of the VCO. Before disciplining the VCO, the GNSS receiver 106 may compare a counter that increments each time a signal outputted by the VCO is high (e.g., is a digital "1") to a predetermined counter value. This predetermined counter value may represent a number of times that the VCO signal should go high during one second. If the counter is less than the predetermined counter value, then the VCO should be adjusted to have a higher frequency. If the counter is greater than the predetermined counter value, the VCO should be adjusted to have a lower frequency.

In some embodiments, the position, velocity parameter, acceleration parameter, and time solution of the SV 102 may be related to the time and position information of a tracked GNSS satellite 104 using the following equation:

$$c(t-t_s)=\sqrt{(x-x_s)^2+(y-y_s)^2+(x-z_s)^2}$$

Equation (1)

Here, variables x, y, z, and t may represent position (x, y, z) information and time (t) information of the SV 102. Constants $x_s$, $y_s$, $z_s$, and $t_s$ may represent position $(x_s, y_s, z_s)$ information and time $(t_s)$ information of a tracked GNSS satellite 104 (e.g., received by one GNSS satellite). Constant c may represent the speed of signal propagation (e.g., the speed of light, approximately 3E8 meters per second (m/s)) In these embodiments, as there are four variables representing the position and time information of the SV 102, at least four navigation messages each originating from a separate GNSS satellite 104 may be required to conventionally calculate or estimate the position and time information of the SV 102. The SV 102 may receive more than four navigation messages from distinct GNSS satellites 104 and still be in GNSS lock. Thus, as long as the SV 102 receives at least four navigation messages with same timestamps (e.g., each corresponding to an edge of a same second) originating from different GNSS satellites 104, the SV 102 may be in GNSS lock, and GNSS lock logic 112 may be used to estimate the position and time solutions for the SV 102 using equation (1). In at least one embodiment, the GNSS lock logic 112 may utilize equation (1) via the following system of equations:

$$c(t-t_{s1})=\sqrt{(x-x_{s1})^2+(y-y_{s1})^2+(z-z_{s1})^2}$$

$$c(t-t_{s1})=\sqrt{(x-x_{s2})^2+(y-y_{s2})^2+(z-z_{s2})^2}$$

$$c(t-t_{s3})=\sqrt{(x-x_{s3})^2+(y-y_{s3})^2+(z-z_{s3})^2}$$

$$c(t-t_{s4})=\sqrt{(x-x_{s4})^2+(y-y_{s4})^2+(z-z_{s4})^2}$$

Equations (2)

Here, constants $x_{s1}$, $y_{s1}$, $z_{s1}$, and $t_{s1}$ may represent position and time information of a first tracked GNSS satellite 104, constants $x_{s2}$, $y_{s2}$, $z_{s2}$, and $t_{s2}$ may represent position and time information of a second tracked GNSS satellite 104, constants $x_{s3}$, $y_{s3}$, $z_{s3}$, and $t_{s3}$ may represent position and time information of a third tracked GNSS satellite 104, and constants $x_{s4}$, $y_{s4}$, $z_{s4}$, and $t_{s4}$ may represent position and time information of a fourth tracked GNSS satellite 104. Each of these sets of constants may have been received from different navigations messages (e.g., first, second, third, and fourth navigation messages). The GNSS lock logic 112 is described below in more detail with respect to FIG. 2.

In at least one embodiment, velocity and acceleration of the SV 102 may also be determined (e.g., estimated or calculated) using the navigation messages. The following is a non-limiting example of how velocity and acceleration of the SV 102 may be determined. The velocity and acceleration of the SV 102 can be determined using the Doppler effect observed in the received navigation messages. This Doppler effect causes a shift in the frequency of the received signals (e.g., navigation messages) due to the relative motion between the satellite and the receiver. By analyzing the frequency shift, the SV 102 (e.g., the GNSS receiver 106) can infer the rate of change between itself and the satellite, which directly relates to the velocity of the SV 102 along the line of sight to the satellite. This "line-of-sight" velocity refers to the component of the receiver's velocity that is along the vector pointing directly from the satellite to the receiver. Thus, more than one navigation message from different GNSS satellites 104 is required to calculate the velocity of the SV 102 in the Earth-Centered, Earth-Fixed (ECEF) coordinate space. Each GNSS satellite 104 provides information about the ling-of-sight velocity relative to itself. Additionally, since the velocity of the SV 102 in three-dimensional space includes components in multiple directions, simply knowing the line-of-sight velocities from individual satellites is typically insufficient to determine the complete velocity vector in the ECEF space. Instead, the receiver uses measurements (e.g., ephemeris data, pseudoranges, carrier phase measurements) from multiple satellites, each with its own line-of-sight velocity, to solve for the velocity vector of the SV 102 in three-dimensional space using mathematical techniques such as least squares estimation or Kalman filtering.

To determine acceleration, the SV 102 can analyze changes in the Doppler frequency over time. Acceleration causes a change in velocity, which, in turn, affects the rate of change of the Doppler frequency. By tracking these changes in frequency over successive navigation messages received from a same GNSS satellite 104, the SV 102 can estimate its own acceleration. This information, combined with the ephemeris data of the GNSS satellite 104 and other parameters, can enable the SV 102 (e.g., the GNSS receiver 106) to determine the velocity and acceleration of the SV 102 in the ECEF three-dimensional space.

Once the GNSS receiver 106 detects signals from multiple GNSS satellites 104, the GNSS receiver 106 may proceed to track each of these GNSS satellites 104 by continuously monitoring the phase, frequency, and amplitude of the respective signals. Typically, navigation messages are sent simultaneously by respective GNSS satellites 104 within the GNSS constellation. These navigation messages are broadcast simultaneously at regular intervals. For example, these navigation messages may each be sent at the beginning of each second. Based on the relative receptions of these navigation messages, the GNSS receiver 106 can determine a pseudorange for each tracked GNSS satellite 104. A pseudorange is an estimated distance between a GNSS receiver and a satellite based on the time it takes for the satellite's signal to travel to the receiver. These pseudoranges are called "pseudo" because this measurement is not an exact range measurement due to factors such as clock errors and signal propagation delays. However, these pseudoranges may still facilitate determining the receiver's position relative to the tracked GNSS satellites through trilateration, where the intersection of pseudoranges from multiple tracked GNSS satellites 104 helps pinpoint the position of the SV 102. By comparing timestamps embedded within the received navigation messages, the GNSS receiver 106 can calculate the time differences of arrival (TDOA) between the signals emitted by the different GNSS satellites 104. These TDOA measurements, coupled with the known propagation speed of electromagnetic signals, enable the receiver to compute pseudoranges-estimates of the distances between the SV and each satellite. This process forms the basis of trilateration, where the intersection of pseudoranges from multiple satellites allows the receiver to determine its precise position in three-dimensional space. In at least one embodiment, this trilateration may be at least partially represented by equation (1).

However if less than four navigation signals sent concurrently (e.g., are transmitted on a same edge of a same second) by different GNSS satellites 104 are received by the GNSS receiver 106, the SV 102 may not be able to use conventional trilateration techniques as described above to determine position and time information of the SV 102. This may be due to the GNSS receiver 106 receiving position and time information for less than four different GNSS satellites 104, which may mean that the SV 102 is has lost GNSS lock and is now in GNSS holdover. In certain operational scenarios (e.g., fast changing skyviews, processing time contention from other processes, or beta angle flips where the SV is upside down and one GNSS antenna is pointing at Earth), the GNSS receiver 106 may encounter situations where it receives less than four navigation messages from GNSS satellites 104. Trilateration may typically rely on determining the intersection of pseudoranges from at least four GNSS satellites 104 to estimate the ECEF position of the SV 102 in three-dimensional space. With fewer than four satellites, the receiver lacks sufficient information to perform trilateration effectively, and thus position and time information of the SV 102 may not be accurately estimated using traditional trilateration techniques.

In such scenarios where less than four unique navigation signals are received by the GNSS receiver 106, a different technique may be implemented by GNSS holdover logic 114 to accurately estimate the time information of the SV 102. In at least one embodiment, the GNSS holdover logic 114 may utilize a last known position, velocity, and acceleration of the SV 102 may be used in lieu of the missing navigation signals. The "last known" position, velocity, and acceleration may be the most recent position, velocity, and acceleration of the SV 102 that was calculated during GNSS lock (i.e., before GNSS holdover, before navigation messages from less than four tracked GNSS satellites 104 with the same timestamp are received by the SV 102). In at least one embodiment, the GNSS holdover logic 114 may use the last known position, velocity, and acceleration concurrently with position and time information of one tracked GNSS satellite 104 per the following equation (3):

$$c(t - t_s) = \sqrt{\begin{aligned} &\left(x_l + v_{xl} + a_{xl}(t - t_l)^2 - x_s\right)^2 + \\ &\left(y_l + v_{yl} + a_{yl}(t - t_l)^2 - y_s\right)^2 + \\ &\left(z_l + v_{zl} + a_{zl}(t - t_l)^2 - z_s\right)^2 \end{aligned}} \qquad \text{Equation (3)}$$

Here, $x_l$, $y_l$, $z_l$ represent the last know position of the SV 102, $v_{xl}$, $v_{yl}$, $v_{zl}$ represent the last known velocity of the SV 102, and $a_{xl}$, $a_{yl}$, $a_{zl}$ represent the last known acceleration of the SV 102. Constants $x_s$, $y_s$, $z_s$, and $t_s$ may represent position $(x_s, y_s, z_s)$ information and time $(t_s)$ information of the one tracked GNSS satellite 104, similar to equation (1). Constant c may represent the speed of signal propagation. Thus, in equation (3), there may be a single variable to solve for: t, which represents the time solution for the SV 102. By using equation (3), only one navigation message with position and time information of a GNSS satellite 104 may be needed to estimate the time solution of the SV 102.

This technique of estimating the time solution for the SV 102 may be iteratively used while the SV 102 is in GNSS holdover. In at least one embodiment, this technique takes into account an amount of time that has elapsed between the most recent time a time solution was calculated while the SV 102 was in GNSS lock (e.g., a first time) and a current time (e.g., a second time). This technique of estimating the time solution while in GNSS holdover may be used as long as the SV 102 receives at least one navigation message from a tracked GNSS satellite 114. In at least one embodiment, equation (3) may be used in conjunction with two or three navigation messages. By determining different time solutions using equation (3) with multiple different navigation messages, these different time solutions may be averaged or otherwise compared (e.g., via least squares estimation) to more precisely estimate the time solution of the SV 102. In another embodiment where two or three navigation messages are received, the GNSS holdover logic 114 may use a system of equations approach to solve for one or more of the position variables (e.g., x, y, z of equation (1)) of the SV 102 before replacing the remaining position variables with the last known position, velocity, and acceleration described above. In this embodiment, the GNSS holdover logic 114 may prioritize which position variable(s) to solve for based on one or more of the last known position, velocity, or acceleration, or an estimated current position, velocity, or acceleration determined using almanac or ephemeris data. For example, if the last known acceleration of the position variable z is significantly lower than the last known acceleration of the other position variables x and y, the GNSS holdover logic 114 may prioritize solving for position variable z over position variables x and y. The GNSS holdover logic 114 is described below in more detail with respect to FIG. 2.

In at least one embodiment, the GNSS receiver 106 may perform some or all of the operations described in relation to one or more of the GNSS lock logic 112 and the GNSS holdover logic 114. In another embodiment, the operations described in relation to the GNSS lock logic 112 and the GNSS holdover logic 114 may be performed by processing logic (e.g., including hardware, software, firmware, or a combination thereof) operatively coupled to the GNSS receiver 106.

Whether in GNSS lock or holdover, the SV 102 may continuously update its position (e.g., estimated ECEF position, velocity, and acceleration parameters) and time solutions to help ensure robust and reliable navigation performance. In some embodiments, these position and time solutions described herein may be updated at least once a second. In another embodiment, these position and time solutions may be updated every few seconds.

FIG. 2 is a flowchart illustrating a process 200 of synchronizing a pulse per second (PPS) system 108 to GNSS time, according to one embodiment. The process 200 may be performed by processing logic that may comprise hardware (e.g., circuitry, dedicated logic, programmable logic, microcode, etc.), software (e.g., instructions run on a processing device to perform hardware simulation), firmware, or a combination thereof. In at least one embodiment, the processing logic may refer to one or more portions of a device, such as a GNSS receiver (e.g., the GNSS receiver 106) and other portions (e.g., downstream of the GNSS receiver) of a satellite capable of processing navigation message(s) and determining position and time solutions based on those navigation message(s). These portions may include one or more processors and a memory storing instructions that, when executed by the one or more processors (or the GNSS receiver), configure the SV to perform the process 200. In some embodiments, the process 200 may be performed by a space vehicle (SV), such as the SV 102 described above with respect to FIG. 1, or a satellite 502 as described below with respect to FIGS. 5 and 6. The process 200 can be performed at least partially by other devices described herein.

In at least one embodiment, the SV receives navigation message(s) with same timestamps from different GNSS satellites 104 at block 202. Each of these timestamps may refer to an edge of a same GNSS time second. If no navigation message is received, the SV may wait until at least one navigation message is received before moving on to decision block 204.

At block 204, the SV may determine how many unique navigation messages were received (e.g., received by the GNSS receiver 106) that share the same timestamp. Unique navigation messages may originate at different GNSS satellites 104 that are each tracked by the SV. If at least four unique navigation messages were received, the SV may determine (e.g., estimate or calculate) position and time solutions using the GNSS lock logic 112 at block 206. The GNSS lock logic 112 may include at least operations related to blocks 206, 208. If less than four unique navigation messages were received, the SV may determine position and time solutions using the GNSS holdover logic 114 at block 210. The GNSS holdover logic 114 may include at least operations related to blocks 210, 214.

At block 206, the SV may calculate a current position, velocity, acceleration, and a first time solution of the SV using equation (1) as described above with respect to FIG. 1. The first time solution may allow the SV to understand the GNSS time relative to an on-board clock of the SV, and subsequently allow the SV to synchronize a pulse per second (PPS) system (e.g., PPS system 108) of the SV to the GNSS time at block 208. Once synchronized, the PPS system may generate a pulse at the edge of a GNSS time second at block 216. In at least one embodiment, the PPS system may be synchronized to the GNSS time by offsetting the on-board clock by a value indicated by the time solution.

At block 210, the SV may estimate a second time solution using a most recent position, velocity, and acceleration calculated during GNSS lock. The most recent position may be a "last known" position, velocity, and acceleration parameters of the SV that was calculated during GNSS lock (i.e., before GNSS holdover). In at least one embodiment, the GNSS holdover logic 114 may use the last known position, velocity, and acceleration concurrently with position and time information of at least one tracked GNSS satellite 104, as described above with respect to FIG. 1. The second time solution may allow the SV to understand the GNSS time relative to an on-board clock of the SV, and subsequently allow the SV to synchronize the PPS system of the SV to the GNSS time at block 214. Once synchronized, the PPS system may generate the pulse at the edge of a GNSS time second at block 216. The SV may continually update the time solution to synchronize the PPS system to GNSS time, as is illustrated by the feedback loop between block 216 and block 202.

At block 212, the SV may estimate its own position. In at least one embodiment, this position estimation may be performed concurrently with estimating the second time solution. In this embodiment, the estimated position of the SV may be calculated using the last known position, velocity, and acceleration of the SV, as can be seen in equation (3). Additionally, several different methods or techniques may be implemented alternatively or in addition to the position estimation concurrent to estimating the second time estimation. These different methods or techniques to estimate the current position of the SV while being in GNSS holdover may include using ephemeris data or almanac data. Ephemeris data provides detailed, precise information about the orbit of a GNSS satellite. Ephemeris data includes parameters such as the satellite's position, velocity, and clock correction terms. Ephemeris data is broadcast by each satellite and is valid for a short period (e.g., a few hours). During GNSS holdover, the SV may use the last known ephemeris data to predict the satellite's position for a limited time. The accuracy of position estimation using this method decreases with time, as the prediction becomes outdated. Almanac data contains coarser orbital information for all satellites in the GNSS constellation and is typically used for satellite tracking and initial acquisition. This data has a longer validity period (e.g., several weeks or months), but is less precise compared to ephemeris data. During GNSS holdover, almanac data can help estimate the position of the SV, though it provides less accurate positioning than ephemeris data. Other methods or techniques for estimating the position of the SV during GNSS holdover may include the use of inertial navigation systems (INS), dead reckoning, or cross-link ranging. Inertial Navigation Systems use accelerometers and gyroscopes to estimate the position, orientation, and velocity (trajectory) of a moving object without the need for external references. Dead reckoning involves calculating the current position by using a previously determined position, and advancing that position based upon known or estimated speeds over elapsed time and course. Cross-link ranging allows inter-satellite links to exchange ranging data and time corrections directly with each other. This can help maintain the accuracy of the overall constellation's positioning data, which may indirectly benefit individual satellite position accuracy during holdover.

Figure 3:
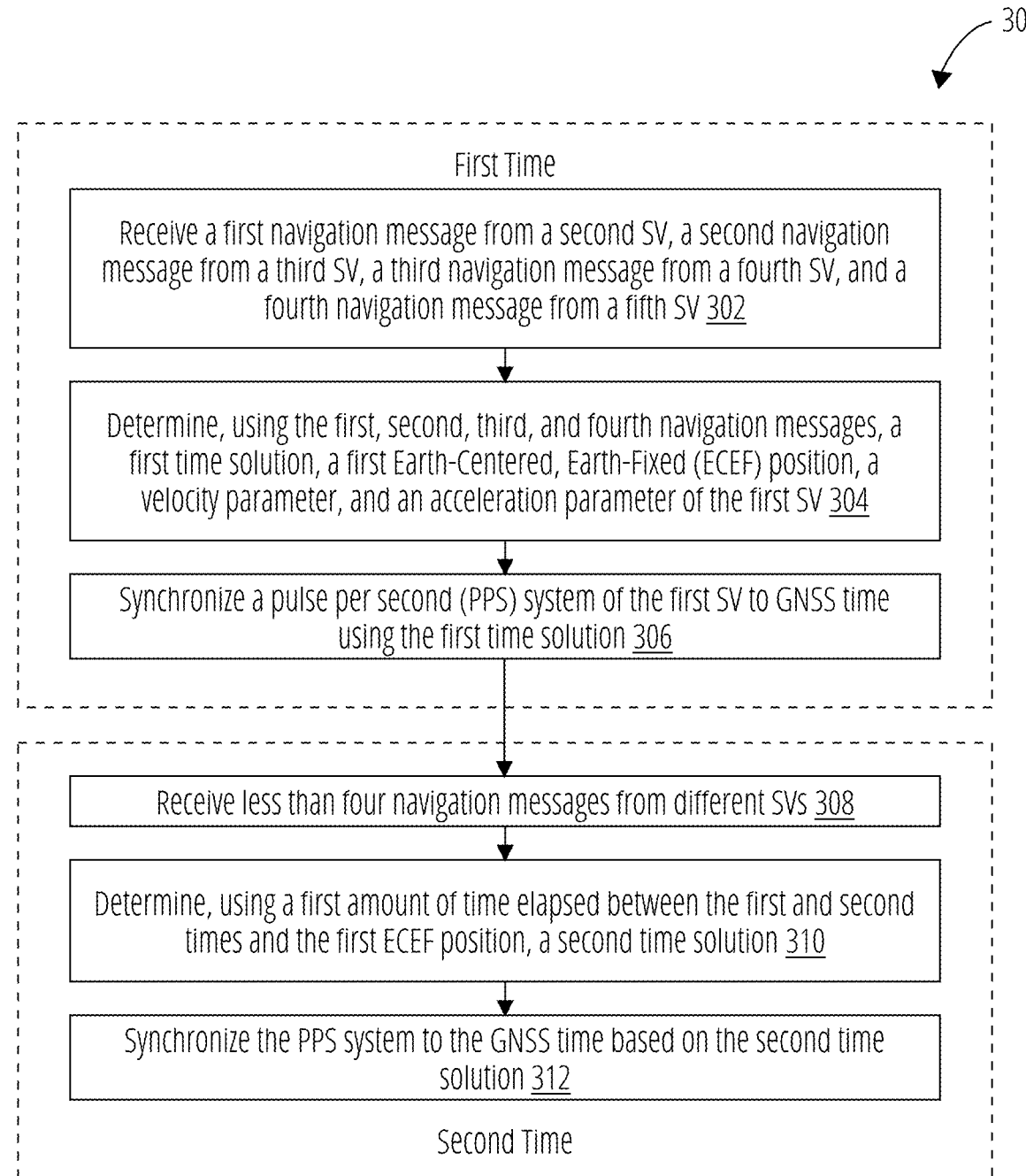
FIG. 3 illustrates a method 300 in accordance with one embodiment.

FIG. 3 illustrates a method 300 of synchronizing a PPS system to GNSS time, according to one embodiment. The method 300 may be performed by processing logic that may comprise hardware (e.g., circuitry, dedicated logic, programmable logic, microcode, etc.), software (e.g., instructions run on a processing device to perform hardware simulation), firmware, or a combination thereof. In at least one embodiment, the processing logic may refer to one or more portions of a device, such as a GNSS receiver (e.g., the GNSS receiver 106) and other portions (e.g., downstream of the GNSS receiver) of a satellite capable of processing navigation message(s) and determining position and time solutions based on those navigation message(s). These portions may include one or more processors and a memory storing instructions that, when executed by the one or more processors (or the GNSS receiver), configure the SV to perform the process 200. These portions may include one or more processors and a memory storing instructions that, when executed by the one or more processors (or the GNSS receiver), configure the SV to perform the method 300. In some embodiments, the method 300 may be performed by a space vehicle (SV), such as the SV 102 described above with respect to FIG. 1, or a satellite 502 as described below with respect to FIGS. 5 and 6. The method 300 can be performed at least partially by other devices described herein.

At block 302, a first SV may receive a first navigation message from a second SV, a second navigation message from a third SV, a third navigation message from a fourth SV, and a fourth navigation message from a fifth SV. Each of these navigation messages may include positional and timing data corresponding to their respective SVs. These four navigation messages may share a same timestamp. Because at least four navigation messages are received, the first SV may be in GNSS lock.

At block 304, the first SV may determine a first time solution, a first Earth-Centered, Earth-Fixed (ECEF) position, a velocity parameter, and an acceleration parameter of the first SV. These may be determined using the first, second, third, and fourth navigation messages.

At block 306, the first SV may synchronize a pulse per second (PPS) system of the first SV to GNSS time using the first time solution. In at least one embodiment, operations corresponding to blocks 302, 304, 306 are performed at a first time, while operations corresponding to blocks 308, 310, 312 are performed at a second time after the first time.

At block 308, the first SV may receive less than four navigation messages from different SVs. These navigation messages may also share a same timestamp. Because less than four navigation messages are received at the second time, the first SV may be in GNSS holdover at the second time.

At block 310, the first SV may determine a second time solution. This second time solution may be determined using a first amount of time elapsed between the first and second times and the first ECEF position. In some embodiments, this second time solution may be based on one or more of the fifth navigation message from a sixth SV, a sixth navigation message from a seventh SV, or an eighth navigation message from an eighth SV. In at least one embodiment, the first SV may receive less than four navigation messages total during the second time.

At block 312, the first SV may synchronize the PPS system to the GNSS time based on the second time solution. In some embodiments, the first SV may synchronize the PPS system to the GNSS time based on the second time solution by comparing the second time solution to an on-board clock of the first SV.

In at least one embodiment, at a third time, the first SV may receive less than four navigation messages total from different SVs (e.g., be in GNSS holdover) at the third time. Here, the first SV may determine a third time solution. This second time solution may be determined using a second amount of time elapsed between the first and third times and the first ECEF position. The first SV may synchronize the PPS system based on this third time solution.

Figure 4:
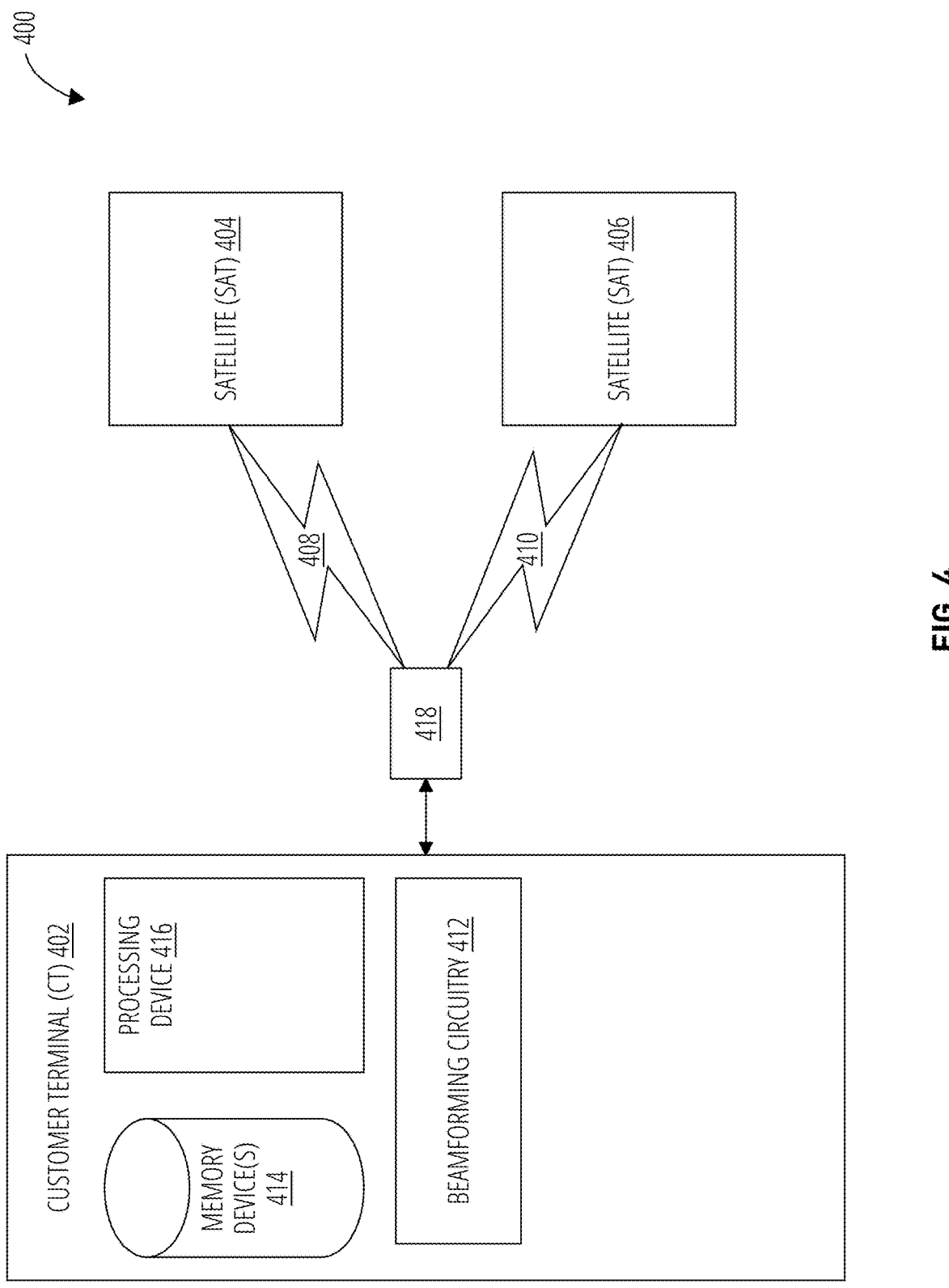
FIG. 4 is a block diagram of a satellite (SAT) network including a customer terminal with a phased array with in-field calibration antennas, according to at least one embodiment.

FIG. 4 is a block diagram of a satellite (SAT) network 100 including a customer terminal (CT 402) with a phased array antenna 418 with in-field calibration antennas according to at least one embodiment. The satellite network 400 can include multiple communication devices, including communication devices in CTs, SATs, etc. The CT 402 can be the UT 510 described below with respect to FIG. 5. The SAT 404 can be any one of the SAT1 504a, SAT2 504b, . . . , etc., of FIG. 5. The communication devices in the satellite network 400 can receive position, navigation, and timing (PNT) information from an SAT 406. The processing device 416 can establish a communication link 410 with the SAT 404 and a communication link 408 with SAT 406. The SAT 404 and SAT 406 can be artificial satellites and may include one or more satellite communication elements (e.g., discussed further in FIG. 5 to FIG. 8). The SAT 404 can be considered an anchor SAT that provides PNT information.

In at least one embodiment, the CT 402 includes one or more processing devices 416 that implement beamforming circuitry 412, and one or more memory device(s) 414. The processing device 416 can be or include one or more CPUs, microcontrollers, field programmable gate arrays, or other types of processors. The beamforming circuitry 412 can be coupled to one or more antennas, such as a phased array phased array antenna 118, to communicate with other devices. The CT 402 can include other circuitry for communicating wirelessly. For example, the CT 402 can include one or more RF chains. The RF chains can have low-noise amplifiers (LNAs), automatic gain controllers (AGCs), analog-to-digital converters (ADCs), digital beamforming (DBF) devices, etc., to transmit signals and/or process received signals (e.g., directs analog and digital beamforming components, converts the signal to a digital representation, and processing the digital information) to produce digital samples of the received signal. In some embodiments, instead of two or more antennas, a single antenna with multiple apertures may be used. The RF chain(s) can be configured to directly receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values, such as phase shifting values, signal amplifier values, etc., that are configured to steer a signal (e.g., main lobe, side lobes, signal minimum points, etc.) to orient at different directions. An antenna gain pattern may include a main lobe, side lobes, and signal minimums spread across various directions relative to a bearing angle of an antenna array. In some embodiment, a bearing angle is defined as a direction normal to a plane of an antenna array (or, more generally, a portion and an array antenna). Further details regarding beamforming and beam steering are discussed in FIG. 8.

Although devices of the satellite network 400 are illustrated as having several separate functional elements, one or more of the functional elements may be combined and may be implemented by combinations of software-configured elements, such as processing elements, including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of a device may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 5:
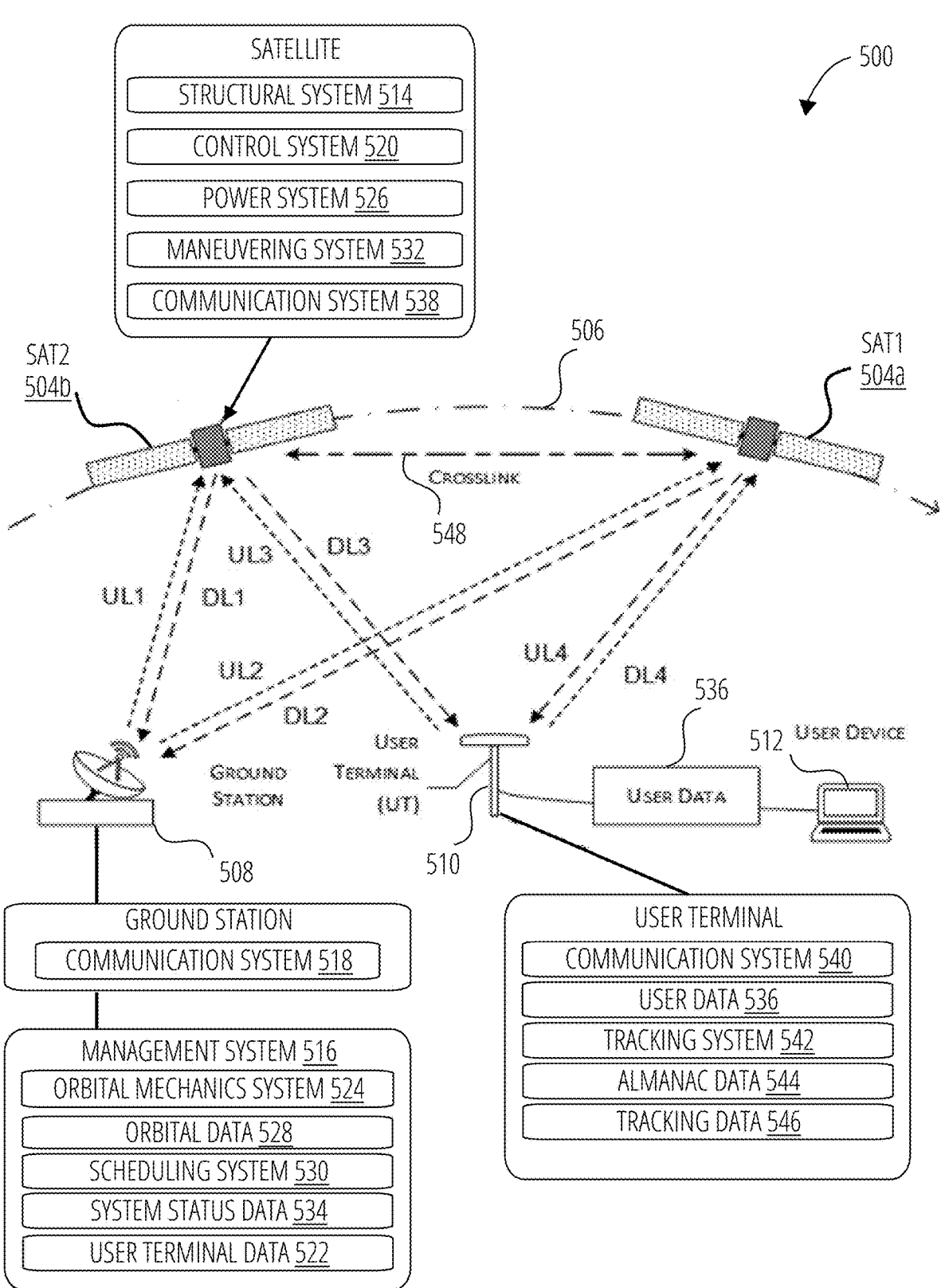
FIG. 5 illustrates a portion of a communication system that includes two satellites of a constellation of satellites, each satellite being in orbit, according to at least one embodiment.

FIG. 5 illustrates a portion of a communication system 500 that includes two satellites of a constellation of satellite 502 (e.g., SAT1 504a, SAT2 504b, . . . , etc.), each satellite 502 being in orbit 506 according to embodiments of the present disclosure. The system 500 shown here comprises a plurality (or "constellation") of satellites SAT1 504a, SAT2 504b, . . . , etc., each satellite 502 being in orbit 506 as part of a satellite network, such as satellite network 400 of FIG. 4. Also shown is a ground station 508, a user terminal (UT) 510 (also referred to herein as customer terminal (CT)), and a user device 512.

The constellation may comprise hundreds or thousands of satellite 502, in various orbits 506. For example, one or more of these satellite 502 may be in non-geosynchronous orbits (NGOs) in which they are in constant motion with respect to the Earth. For example, the orbit 506 is a low earth orbit (LEO). In this illustration, orbit 506 is depicted with an arc pointed to the right. A first satellite SAT1 504a is leading (ahead of) a second satellite SAT2 504b in the orbit 506.

The satellite 502 may comprise a structural system 514, a control system 520, a power system 526, a maneuvering system 532, and a communication system 538. In other implementations, some systems may be omitted or other systems added. One or more of these systems may be communicatively coupled with one another in various combinations.

The structural system 514 comprises one or more structural elements to support the operation of the satellite 502. For example, the structural system 514 may include trusses, struts, panels, and so forth. The components of other systems may be affixed to or housed by the structural system 514. For example, the structural system 514 may provide mechanical mounting and support for solar panels in the power system 526. The structural system 514 may also provide thermal control to maintain components of the satellite 502 within operational temperature ranges. For example, the structural system 514 may include louvers, heat sinks, radiators, and so forth.

The control system 520 provides various services, such as operating the onboard systems, resource management, providing telemetry, processing commands, and so forth. For example, the control system 520 may direct the operation of the communication system 538.

The power system 526 provides electrical power to operate the components onboard the satellite 502. The power system 526 may include components to generate electrical energy. For example, the power system 526 may comprise one or more photovoltaic cells, thermoelectric devices, fuel cells, and so forth. The power system 526 may include components to store electrical energy. For example, the power system 526 may comprise one or more batteries, fuel cells, and so forth.

The maneuvering system 532 maintains the satellite 502 in one or more specified orientations or orbit 506. For example, the maneuvering system 532 may stabilize the satellite 502 with respect to one or more axes. In another example, the maneuvering system 532 may move the satellite 502 to a specified orbit 506. The maneuvering system 532 may include one or more computing devices, sensors, thrusters, momentum wheels, solar sails, drag devices, and so forth. For example, the sensors of the maneuvering system 532 may include one or more global navigation satellite system (GNSS) receivers, such as global positioning system (GPS) receivers, to provide information about the position and orientation of the satellite 502 relative to Earth. In another example, the sensors of the maneuvering system 532 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 538 provides communication with one or more other devices, such as other satellite 502, ground stations 508, user terminals 510, and so forth. The communication system 538 may include one or more modems, digital signal processors, power amplifiers, antennas (including at least one antenna that implements multiple antenna elements, such as a phased array antenna and an embedded calibration antenna), processors, memories, storage devices, communications peripherals, interface buses, and so forth. Such components support communications with other satellite 502, ground stations 508, user terminals 510, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 538 may be output to other systems, such as the control system 520, for further processing. Output from a system, such as the control system 520, may be provided to the communication system 538 for transmission.

One or more ground stations 508 are in communication with one or more satellite 502. The ground stations 508 may pass data between the satellite 502, a management system 516, networks such as the Internet, and so forth. The ground stations 508 may be emplaced on land, on vehicles, at sea, and so forth. Each ground station 508 may comprise a communication system 518. The aspects and embodiments of the present disclosure with respect to FIGS. 1-3 may occur within one or more of the communication system 518 of the ground station 508 and the satellite 502. Each ground station 508 may use the communication system 518 to establish communication with one or more satellite 502, other ground stations 508, and so forth. The ground station 508 may also be connected to one or more communication networks. For example, the ground station 508 may connect to a terrestrial fiber optic communication network. The ground station 508 may act as a network gateway, passing user data 536 or other data between the one or more communication networks and the satellite 502. Such data may be processed by the ground station 508 and communicated via the communication system 518. The communication system 518 of a ground station 508 may include components similar to those of the communication system 538 of a satellite 502 and may perform similar communication functionalities. For example, the communication system 518 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 508 are in communication with a management system 516. The management system 516 is also in communication, via the ground stations 508, with the satellite 502 and the UTs 510. The management system 516 coordinates the operation of the satellite 502, ground stations 508, UTs 510, and other resources of the communication system 500. The management system 516 may comprise one or more of an orbital mechanics system 524 or a scheduling system 530. In some embodiments, the scheduling system 530 can operate in conjunction with a hard disk (HD) controller.

The orbital mechanics system 524 determines orbital data 528 that is indicative of a state of a particular satellite 502 at a specified time. In one implementation, the orbital mechanics system 524 may use orbital elements that represent characteristics of the orbit 506 of the satellite 502 in the constellation to determine the orbital data 528 that predicts position, velocity, and so forth of particular satellite 502 at particular times or time intervals. For example, the orbital mechanics system 524 may use data obtained from actual observations from tracking stations, data from the satellite 502, scheduled maneuvers, and so forth to determine the orbital elements. The orbital mechanics system 524 may also consider other data, such as space weather, collision mitigation, orbital elements of known debris, and so forth.

The scheduling system 530 schedules resources to provide communication to the UTs 510. For example, the scheduling system 530 may determine handover data that indicates when communication is to be transferred from the first satellite SAT1 504*a* to the second satellite SAT2 504*b*. Continuing the example, the scheduling system 530 may also specify communication parameters such as frequency, timeslot, and so forth. During operation, the scheduling system 530 may use information such as the orbital data 528, system status data 534, user terminal data 522, and so forth.

The system status data 534 may comprise information such as which UTs 510 are currently transferring data, satellite availability, current satellite 502 in use by respective UTs 510, capacity available at particular ground stations 508, and so forth. For example, the satellite availability may comprise information indicative of satellite 502 that are available to provide communication service or those satellite 502 that are unavailable for communication service. Continuing the example, a satellite 502 may be unavailable due to malfunction, previous tasking, maneuvering, and so forth. The system status data 534 may be indicative of past status, predictions of future status, and so forth. For example, the system status data 534 may include information such as projected data traffic for a specified interval of time based on previous transfers of user data 536. In another example, the system status data 534 may be indicative of future statuses, such as a satellite 502 being unavailable to provide communication service due to scheduled maneuvering, scheduled maintenance, scheduled decommissioning, and so forth.

The user terminal data 522 may comprise information such as a position of a particular UT 510. The user terminal data 522 may also include other information, such as a priority assigned to user data 536 associated with that UT 510, information about the communication capabilities of that particular UT 510, and so forth. For example, a particular UT 510 in use by a business may be assigned a higher priority relative to a UT 510 operated in a residential setting. Over time, different versions of UTs 510 may be deployed, having different communication capabilities, such as being able to operate at particular frequencies, supporting different signal encoding schemes, having different antenna configurations, and so forth.

The UT 510 includes a communication system 540 to establish communication with one or more satellite 502. The communication system 540 of the UT 510 may include components similar to those of the communication system 538 of a satellite 502 and may perform similar communication functionalities. For example, the communication system 540 may include one or more modems, digital signal processors, power amplifiers, antennas (including at least one antenna that implements multiple antenna elements, such as a phased array antenna), processors, memories, storage devices, communications peripherals, interface buses, and so forth. The UT 510 passes user data 536 between the constellation of satellite 502 and the user device 512. The user data 536 includes data originated by the user device 512 or addressed to the user device 512. The UT 510 may be fixed or in motion. For example, the UT 510 may be used at a residence or on a vehicle such as a car, boat, aerostat, drone, airplane, and so forth.

The UT 510 includes a tracking system 542. The tracking system 542 uses almanac data 544 to determine tracking data 546. The almanac data 544 provides information indicative of orbital elements of the orbit 506 of one or more satellite 502. For example, the almanac data 544 may comprise orbital elements such as "two-line element" data for the satellite 502 in the constellation that are broadcast or otherwise sent to the UTs 510 using the communication system 540.

The tracking system 542 may use the current position of the UT 510 and the almanac data 544 to determine the tracking data 546 for the satellite 502. For example, based on the current position of the UT 510 and the predicted position and movement of the satellite 502, the tracking system 542 can calculate the tracking data 546. The tracking data 546 may include information indicative of azimuth, elevation, distance to the second satellite, time of flight correction, or other information at a specified time. The determination of the tracking data 546 may be ongoing. For example, the first UT 510 may determine tracking data 546 every 1000 ms, every second, every five seconds, or at other intervals.

With regard to FIG. 5, an uplink (UL) is a communication link that allows data to be sent to a satellite 502 from a ground station 508, UT 510, or a device other than another satellite 502. Uplinks are designated as UL1, UL2, UL3, and so forth. For example, UL1 is a first uplink from the ground station 508 to the second satellite 902*b*. In comparison, a downlink is a communication link that allows data to be sent from the satellite 502 to a ground station 508, UT 510, or a device other than another satellite 502. For example, UL1 is a first downlink from the second satellite 902*b* to the ground station 508. The satellite 502 may also be in communication with one another. For example, a crosslink 548 provides for communication between satellite 502 in the constellation.

The satellite 502, the ground station 508, the user terminal 510, the user device 512, the management system 516, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), micro-controllers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

FIG. 6 is a functional block diagram of some systems associated with the satellite 502, according to some implementations. The satellite 502 may comprise a structural system 514, a control system 520, a power system 526, a maneuvering system 532, one or more sensor(s) 602, and a communication system 538. A pulse per second (PPS) system 604 may be used to provide a timing reference to the systems onboard the satellite 502. The PPS system 604 may include the same or similar features as the PPS system 108, as described above. One or more bus(es) 606 may be used to transfer data between the systems onboard the satellite 502. In some implementations, redundant busses may be provided. The bus(es) 606 may include, but are not limited to, data busses such as Controller Area Network Flexible Data Rate (CAN FD), Ethernet, Serial Peripheral Interface (SPI), and so forth. In some implementations, the bus(es) 606 may carry other signals. For example, a radio frequency bus may comprise a coaxial cable, waveguides, and so forth to transfer radio signals from one part of the satellite 502 to another. In other implementations, some systems may be omitted, or other systems added. One or more of these systems may be communicatively coupled with one another in various combinations.

The structural system 514 comprises one or more structural elements to support the operation of the satellite 502.

For example, the structural system 514 may include trusses, struts, panels, and so forth. The components of other systems may be affixed to or housed by the structural system 514. For example, the structural system 514 may provide mechanical mounting and support for solar panels in the power system 526. The structural system 514 may also provide for thermal control to maintain components of the satellite 502 within operational temperature ranges. For example, the structural system 514 may include louvers, heat sinks, radiators, and so forth.

The control system 520 provides various services, such as operating the onboard systems, resource management, providing telemetry, processing commands, and so forth. For example, the control system 520 may direct the operation of the communication system 538. The control system 520 may include one or more flight control processors 608. The flight control processors 608 may comprise one or more processors, FPGAs, and so forth. A tracking, telemetry, and control (TTC) system 610 may include one or more processors, radios, and so forth. For example, the TTC system 610 may comprise a dedicated radio transmitter and receiver to receive commands from a ground station 508, send telemetry to the ground station 508, and so forth. A power management and distribution (PMAD) system 612 may direct the operation of the power system 526, control distribution of power to the systems of the satellite 502, battery 614 charging, and so forth.

The power system 526 provides electrical power to operate the components onboard the satellite 502. The power system 526 may include components to generate electrical energy. For example, the power system 526 may comprise one or more photovoltaic (PV) arrays 616 comprising a plurality of photovoltaic cells, thermoelectric devices, fuel cells, and so forth. One or more PV array actuators 618 may be used to change the orientation of the photovoltaic array(s) 616 relative to the satellite 502. For example, the PV array actuator 618 may comprise a motor. The power system 526 may include components to store electrical energy. For example, the power system 526 may comprise one or more batteries 614, fuel cells, and so forth.

The maneuvering system 532 maintains the satellite 502 in one or more specified orientations or orbit 506. For example, the maneuvering system 532 may stabilize the satellite 502 with respect to one or more axes. In another example, the maneuvering system 532 may move the satellite 502 to a specified orbit 506. The maneuvering system 532 may include one or more of reaction wheel(s) 620, thrusters 622, magnetic torque rods 624, solar sails, drag devices, and so forth. The thrusters 622 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellent, using electrical power obtained from the power system 526 to expel the water and produce thrust. During operation, the maneuvering system 532 may use data obtained from one or more of the sensor(s) 602.

The satellite 502 includes one or more sensor(s) 602. The sensor(s) 602 may include one or more engineering camera(s) 626. For example, an engineering camera 626 may be mounted on the satellite 502 to provide images of at least a portion of the PV array 616. Accelerometer(s) 628 provide information about the acceleration of the satellite 502 along one or more axes. Gyroscope(s) 630 provide information about the rotation of the satellite 502 with respect to one or more axes. The sensor(s) 602 may include a global navigation satellite system (GNSS) receiver 632, such as a Global Positioning System (GPS) receiver, to provide information about the position of the satellite 502 relative to Earth. In some implementations, the GNSS 632 may also provide information indicative of velocity, orientation, and so forth. One or more star tracker(s) 634 may be used to determine an orientation of the satellite 502. A coarse sun sensor 636 may be used to detect the sun, provide information on the relative position of the sun with respect to the satellite 502, and so forth. The satellite 502 may include other sensor(s) 602 as well. For example, the satellite 502 may include a horizon detector, radar, lidar, and so forth.

The communication system 538 provides communication with one or more other devices, such as other satellites 502, ground stations 508, user terminals 510, and so forth. The communication system 538 may include one or more modems 638, digital signal processors, power amplifiers, antennas antenna 640 (including a calibration antenna 642), such as a phased array antenna), processors, memories, storage devices, communications peripherals, interface buses, and so forth. Such components support communications with other satellites 502, ground stations 508, user terminals 510, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 538 may be output to other systems, such as the control system 520, for further processing. Output from a system, such as the control system 520, may be provided to the communication system 538 for transmission.

The communication system 538 may include hardware to support the crosslink 548 (e.g., intersatellite (ISL) link). For example, an intersatellite link FPGA 644 may be used to modulate data sent and received by one or more ISL transceiver(s) 646 to send data between satellites 502. The ISL transceiver(s) 646 may operate using radio frequencies, optical frequencies, and so forth.

A communication FPGA 648 may be used to facilitate communication between the satellite 502 and the ground stations 508, UTs 510, and so forth. For example, the communication FPGA 648 may direct the operation of a modem 638 to modulate signals sent using a downlink transmitter 650 and demodulate signals received using an uplink receiver 652. The satellite 502 may include one or more antennas 640. For example, one or more parabolic antennas may be used to provide communication between the satellite 502 and one or more ground stations 508. In another example, a phased array antenna may be used to provide communication between the satellite 502 and the UTs 510.

Figure 7:
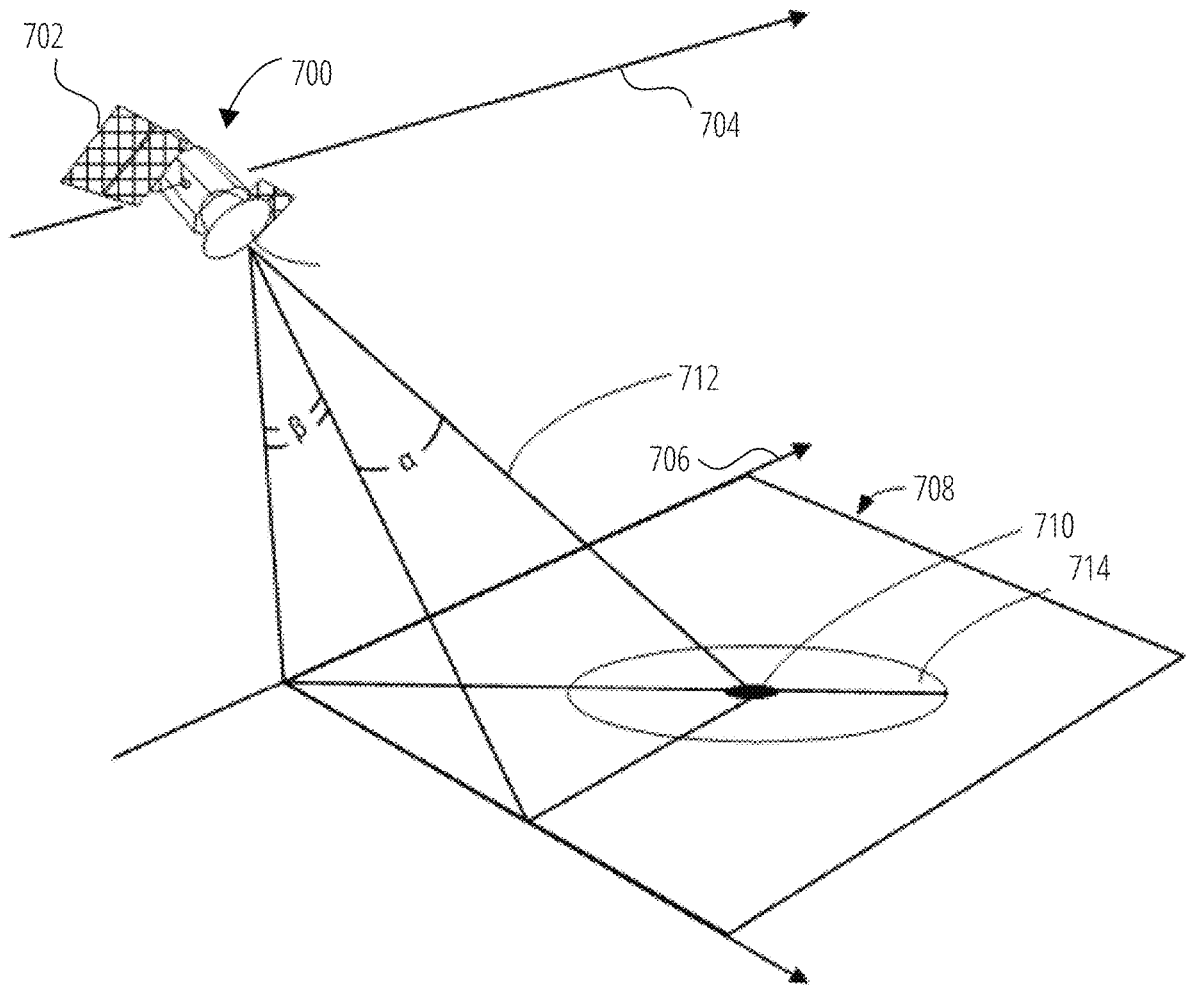
FIG. 7 illustrates the satellite including an antenna system that is steerable, according to at least one embodiment.

FIG. 7 illustrates the satellite 700 including an antenna system 1202 that is steerable according to embodiments of the present disclosure. The satellite 700 can be the SAT 502 of the satellite network 400 of FIG. 4. The antenna system 1102 may include multiple antenna elements that form an antenna and can be mechanically or electrically steered individually, collectively, or a combination thereof. In an example, the antenna is a phased array antenna.

In orbit 506, the satellite 700 follows a path 704, the projection of which onto the surface of the Earth forms a ground path 706. In the example illustrated in FIG. 7, the ground path 706 and a projected axis extending orthogonally from the ground path 706 at the position of the satellite 700, together define a region 708 of the surface of the Earth. In this example, the satellite 700 can establish uplink and downlink communications with one or more of ground stations, user terminals, or other devices within the region 708. In some embodiments, the region 708 may be located in a different relative position to the ground path 706 and the position of the satellite 700. For example, the region 708 may describe a region of the surface of the Earth directly below the satellite 700. Furthermore, embodiments may include communications between the satellite 700, an airborne communications system, and so forth.

As shown in FIG. 7, a communication target 710 (e.g., a ground station, a user terminal, or a CT (such as an HD CT)) is located within the region 708. The satellite 700 controls the antenna system 702 to steer transmission and reception of communications signals to selectively communicate with the communication target 710. For example, in a downlink transmission from the satellite 700 to the communication target 710, a signal beam 712 emitted by the antenna system 702 is steerable within an area 714 of the region 708. In some implementations, the signal beam 712 may include multiple subbeams. The extents of the area 714 define an angular range within which the signal beam 712 is steerable, where the direction of the signal beam 712 is described by a beam angle "α" relative to a surface normal vector of the antenna system 702. In two-dimensional phased array antennas, the signal beam 712 is steerable in two dimensions, described in 15 by a second angle "β" orthogonal to the beam angle α. In this way, the area 714 is a two-dimensional area within the region 708, rather than a linear track at a fixed angle determined by the orientation of the antenna system 702 relative to the ground path 706.

In FIG. 7, as the satellite 700 follows the path 704, the area 714 tracks along the surface of the Earth. In this way, the communication target 710, which is shown centered in the area 714 for clarity, is within the angular range of the antenna system 702 for a period of time. During that time, signals communicated between the satellite 700 and the communication target 710 are subject to bandwidth constraints, including but not limited to signal strength and calibration of the signal beam 712. In an example, for phased array antenna systems, the signal beam 712 is generated by an array of mutually coupled antenna elements, wherein constructive and destructive interferences produce a directional beam. Among other factors, phase drift, amplitude drift (e.g., of a transmitted signal in a transmitter array), and so forth affect the interference properties and, thus, the resultant directional beam or subbeam.

Figure 8:
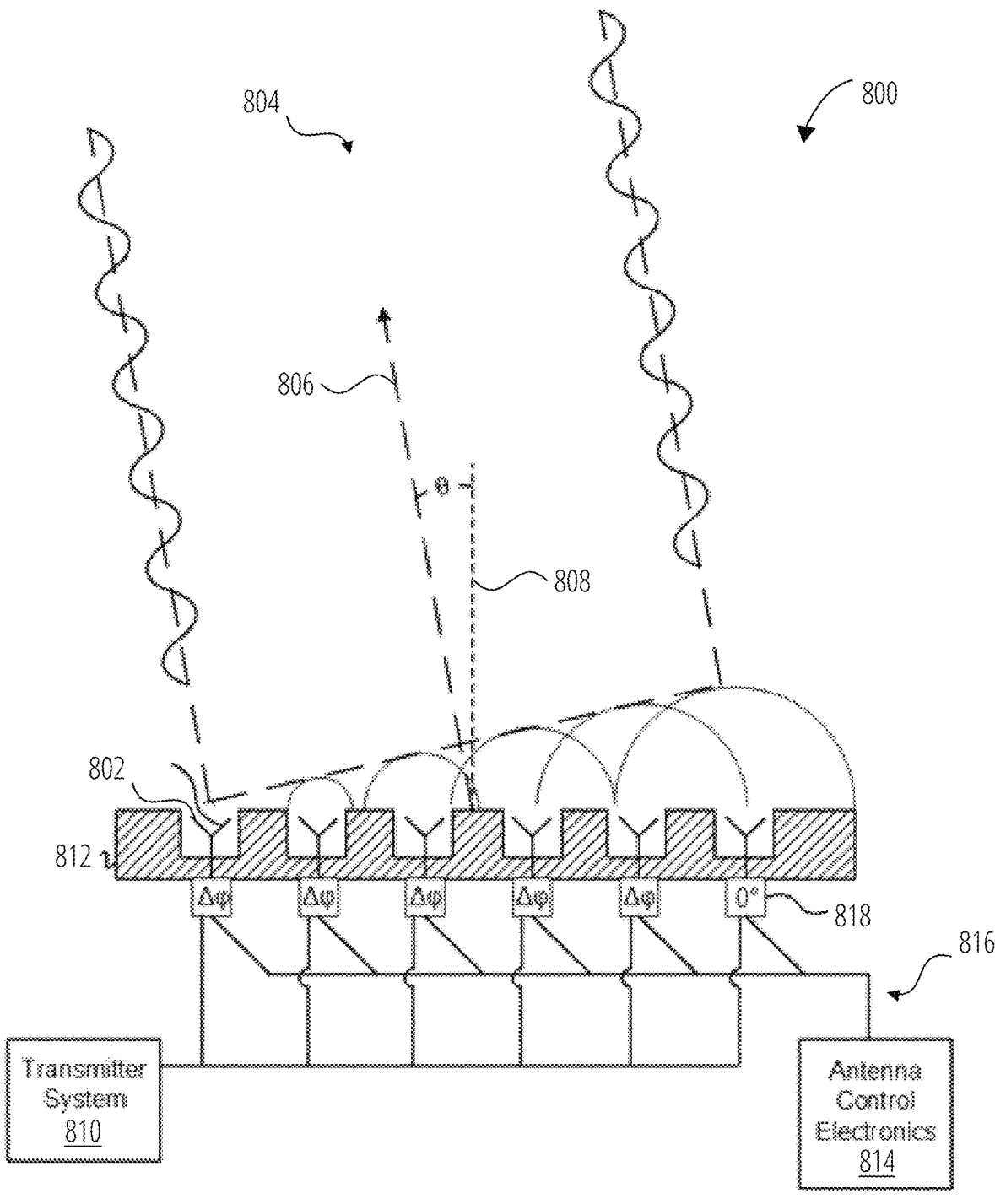
FIG. 8 illustrates a simplified schematic of an antenna, according to at least one embodiment.

FIG. 8 illustrates a simplified schematic of an antenna 800, according to embodiments of the present disclosure. The antenna 800 may be a component of the antenna system 802 of FIG. 8. As illustrated, the antenna 800 is a phased array antenna that includes multiple antenna elements 802. Interference between the antenna elements 802 forms a directional radiation pattern in both transmitter and receiver arrays, forming a beam 804 (beam extents shown as dashed lines). The beam 804 is a portion of a larger transmission pattern (not shown) that extends beyond the immediate vicinity of the antenna 800. The beam 804 is directed along a beam vector 806, described by an angle "0" relative to an axis 808 normal to a surface of the antenna 800. As described below, the beam 804 is one or more of steerable or shapeable through control of operating parameters including, but not limited to, a phase and an amplitude of each antenna element 802.

In FIG. 8, the antenna 800 includes, within a transmitter section 812, the antenna elements 802, which may include, but are not limited to, omnidirectional transmitter antennas coupled to a transmitter system 810, such as the downlink transmitter 650 of FIG. 6. The transmitter system 810 provides a signal, such as a downlink signal, to be transmitted to a ground station on the surface. The downlink signal is provided to each antenna element 802 as a time-varying signal that may include several multiplexed signals. To steer the beam 804 relative to the axis 808, the antenna 800 (e.g., phased array antenna system) includes antenna control electronics 814 controlling a radio frequency (RF) feeding network 816, including multiple signal conditioning components 818 interposed between the antenna elements 802 and the transmitter system 810. The signal conditioning components 818 introduce one or more of a phase modulation or an amplitude modulation (e.g., by phase shifters), as denoted by "$\Delta\varphi$" in FIG. 8, to the signal sent to the antenna elements 802. As shown in FIG. 8, introducing a progressive phase modulation produces interference in the individual transmission of each antenna element 802 that generates the beam 804.

The phase modulation imposed on each antenna element 802 can differ and can be dependent on a spatial location of a communication target that determines an optimum beam vector (e.g., where the beam vector 806 is found by one or more of maximizing signal intensity or connection strength). The optimum beam vector may change with time as the communication target 710 moves relative to the antenna 800 (e.g., phased array antenna system).

What is claimed is:

1. A method of operating a first space vehicle (SV), the method comprising:

at a first time:

receiving a first navigation message from a second SV, a second navigation message from a third SV, a third navigation message from a fourth SV, and a fourth navigation message from a fifth SV, wherein the second, third, fourth, and fifth SVs are different;

determining, using the first, second, third, and fourth navigation messages, a first time solution, a first Earth-Centered, Earth-Fixed (ECEF) position, a velocity parameter, and an acceleration parameter of the first SV; and synchronizing a pulse per second (PPS) system of the first SV to a global navigation satellite system (GNSS) time using the first time solution; and at a second time after the first time:

receiving one or more of a fifth navigation message from a sixth SV, a sixth navigation message from a seventh SV, or a seventh navigation message from an eighth SV, wherein the first SV receives less than four navigation messages total at the second time, and wherein the sixth, seventh, and eighth SVs are different;

determining, using a first amount of time elapsed between the first and second times and the first ECEF position, a second time solution; and synchronizing the PPS system to the GNSS time based on the second time solution.

2. The method of claim 1, wherein determining the second time solution is further based on the velocity parameter and the acceleration parameter.

3. The method of claim 1, further comprising, at a third time after the second time:

receiving less than four navigation messages total from different SVs during the third time; and determining, using a second amount of time elapsed between the first and third times and the first ECEF position, a third time solution; and synchronizing the PPS system to the GNSS time based on the third time solution.

4. The method of claim 1, wherein determining the second time solution is further based on the fifth navigation message.

5. The method of claim 4, wherein determining the second time solution is further based on the sixth navigation message.

6. The method of claim 5, wherein determining the second time solution is further based on the seventh navigation message.

7. The method of claim 1, wherein synchronizing the PPS system to the GNSS time based on the second time solution comprises disciplining an on-board clock based on a predetermined counter value.

8. A first space vehicle (SV) comprising:

a global navigation satellite system (GNSS) receiver;

one or more processors; and a memory storing instructions that, when executed by the one or more processors or the GNSS receiver, configure the SV to:

at a first time:

receive a first navigation message from a second SV, a second navigation message from a third SV, a third navigation message from a fourth SV, and a fourth navigation message from a fifth SV, wherein the second, third, fourth, and fifth SVs are different;

determine, using the first, second, third, and fourth navigation messages, a first time solution, a first Earth-Centered, Earth-Fixed (ECEF) position, a velocity parameter, and an acceleration parameter of the first SV; and synchronize a pulse per second (PPS) system of the first SV to GNSS time using the first time solution; and at a second time after the first time:

receive one or more of a fifth navigation message from a sixth SV, a sixth navigation message from a seventh SV, or a seventh navigation message from an eighth SV, wherein the first SV receives less than four navigation messages total at the second time, and wherein the sixth, seventh, and eighth SVs are different;

determine, using a first amount of time elapsed between the first and second times and the first ECEF position, a second time solution; and synchronize the PPS system to the GNSS time based on the second time solution.

9. The first SV of claim 8, wherein determining the second time solution is further based on the velocity parameter and the acceleration parameter.

10. The first SV of claim 8, wherein the instructions further configure the first SV to, at a third time after the second time:

receive less than four navigation messages total from different SVs at the third time; and determine, using a second amount of time elapsed between the first and third times and the first ECEF position, a third time solution; and synchronize the PPS system to the GNSS time based on the third time solution.

11. The first SV of claim 8, wherein determining the second time solution is further based on the fifth navigation message.

12. The first SV of claim 11, wherein determining the second time solution is further based on the sixth navigation message.

13. The first SV of claim 12, wherein determining the second time solution is further based on the seventh navigation message.

14. The first SV of claim 8, wherein synchronizing the PPS system to the GNSS time based on the second time solution comprises disciplining an on-board clock based on a predetermined counter value.

15. A global navigation satellite system (GNSS) receiver comprising:
one or more processors; and
a memory storing instructions that, when executed by the one or more processors or the GNSS receiver, configure the GNSS receiver to:
at a first time:
receive a first navigation message from a second SV, a second navigation message from a third SV, a third navigation message from a fourth SV, and a fourth navigation message from a fifth SV, wherein the second, third, fourth, and fifth SVs are different;
determine, using the first, second, third, and fourth navigation messages, a first time solution, a first Earth-Centered, Earth-Fixed (ECEF) position, a velocity parameter, and an acceleration parameter of a first SV; and
synchronize a pulse per second (PPS) system of the first SV to GNSS time using the first time solution; and at a second time after the first time:
receive one or more of a fifth navigation message from a sixth SV, a sixth navigation message from a seventh SV, or a seventh navigation message from an eighth SV, wherein the first SV receives less than four navigation messages total at the second time, and wherein the sixth, seventh, and eighth SVs are different;
determine, using a first amount of time elapsed between the first and second times and the first ECEF position, a second time solution; and
synchronize the PPS system to the GNSS time based on the second time solution.

16. The GNSS receiver of claim 15, wherein determining the second time solution is further based on the velocity parameter and the acceleration parameter.

17. The GNSS receiver of claim 15, wherein the instructions further configure the GNSS receiver to, at a third time after the second time:
receive less than four navigation messages total from different SVs at the third time; and
determine, using a second amount of time elapsed between the first and third times and the first ECEF position, a third time solution; and
synchronize the PPS system to the GNSS time based on the third time solution.

18. The GNSS receiver of claim 15, wherein determining the second time solution is further based on the fifth navigation message.

19. The GNSS receiver of claim 18, wherein determining the second time solution is further based on the sixth navigation message.

20. The GNSS receiver of claim 19, wherein determining the second time solution is further based on the seventh navigation message.

* * * * *